United States Patent [19]

Schlick

[11] 4,084,249
[45] Apr. 11, 1978

[54] ELECTRONIC COUNTING SYSTEM WITH KEYBOARD INPUT

[75] Inventor: Helmut Schlick, Weissbrunn, Germany

[73] Assignee: Firma Dr. Johannes Heidenhain GbmH, Traunreut, Germany

[21] Appl. No.: 745,235

[22] Filed: Nov. 26, 1976

[30] Foreign Application Priority Data

Dec. 6, 1975 Germany .......................... 2554927

[51] Int. Cl.² ...................... G06F 15/02; H03K 21/18
[52] U.S. Cl. ................................. 364/705; 235/92 PE
[58] Field of Search .................. 235/152, 156, 92 PE, 235/92 EV, 92 MP

[56] References Cited

U.S. PATENT DOCUMENTS

| | | | |
|---|---|---|---|
| 3,725,873 | 4/1973 | Hare | 235/156 X |
| 3,813,525 | 5/1974 | Kitterman et al. | 235/92 PE |
| 3,821,535 | 6/1974 | Nagakura et al. | 235/156 |
| 3,877,216 | 4/1975 | Mounce et al. | 235/92 PE X |
| 3,962,565 | 6/1976 | Guyen-Phuoc | 235/92 PE |
| 3,983,378 | 9/1976 | Tammi | 235/151.32 |

*Primary Examiner*—Jerry Smith
*Attorney, Agent, or Firm*—Hume, Clement, Brinks, Willian & Olds, Ltd.

[57] ABSTRACT

An electronic counting system having a directional discriminator for accepting input signals representative of the count, a reversible up-down counter responsive to the directional discriminator for performing the counting function, a numerical display for displaying the value of the present count, and logic apparatus for the calculation and display of values for manual input to the up-down counter. The entry logic apparatus includes a keyboard for the manual entry of numerical data and function commands, a computer-calculator element for processing the numerical entry display for displaying the numerical data entered into the keyboard and the function results. A transfer switch applies the numerical data of the entry display to the up-down counter for setting the counter to the entry display value.

7 Claims, 1 Drawing Figure

ELECTRONIC COUNTING SYSTEM WITH KEYBOARD INPUT

BACKGROUND OF THE INVENTION

The invention relates to an electronic counting system which includes apparatus for the manual input of numerical values to which a counting system output is set. Specifically, the subject invention is directed to a counting system having a keyboard for the manual input of numerical values for setting the output value of the counting system.

Prior art electronic counting systems which have provisions for the manual input of initial count values generally accomplish such input by the use of coding switches or keyboards. The disadvantages of the use of coding switches include the amount of space required by their physical structure and the inconvenience of setting numerical wheels. Prior art of keyboard systems generally require complex and expensive circuitry. Moreover, prior art systems having coding switches or keyboards are usually limited in flexibility with respect to the capability of performing calculations for determining the value to be manually applied to the up-down counter of the counting system.

It is therefore an object of this invention to provide an improved keyboard type input system for use with an up-down counter.

Still another object of the present invention is to provide an improved electronic counting system with a keyboard input system which is capable of performing calculations for determining the numerical value to be applied manually to the up-down counter of the counting system.

A further object of the present invention is to provide an improved keyboard type input system for the manual input of numerical values to an up-down counter, which input system includes the capabilities of performing calculations for the determination of the numerical input values.

SUMMARY OF THE INVENTION

The counting system of the subject invention accomplishes the foregoing and other objects by providing a keyboard type input system having a computer-calculator element with numerical data and function commands, and a numerical entry display for displaying numerical data entered on the keyboard as well as numerical results obtained from calculations performed by the computer-calculator element in response to function commands. A transfer switch is provided between the keyboard input system and the up-down counter of the counting system for setting the count value of the counter to the value of the entry display. Connected to the up-down counter is a directional discriminator for accepting input pulses which are representative of the count to be determined and for providing a count input as well as count direction information to the up-down counter. The output of the up-down counter is applied to a numerical display for visually indicating the present count of the counting system.

The advantages of the disclosed electronic counting system include lower circuitry costs due to the readily available components used in the keyboard type input system, as well as small and compact design. Moreover, the disclosed counting system is easy to operate and appropriate for a variety of applications. Another feature of the disclosed electronic counting system is the ease of mounting the keyboard input system on the same base plate within the counting housing as the electronic counter components.

BRIEF DESCRIPTION OF THE DRAWING

The above mentioned and other objects, advantages and features of the present invention will become readily apparent from the following detailed description when read in conjunction with the drawing herein.

DETAILED DESCRIPTION OF THE DISCLOSURE

Figure 1:
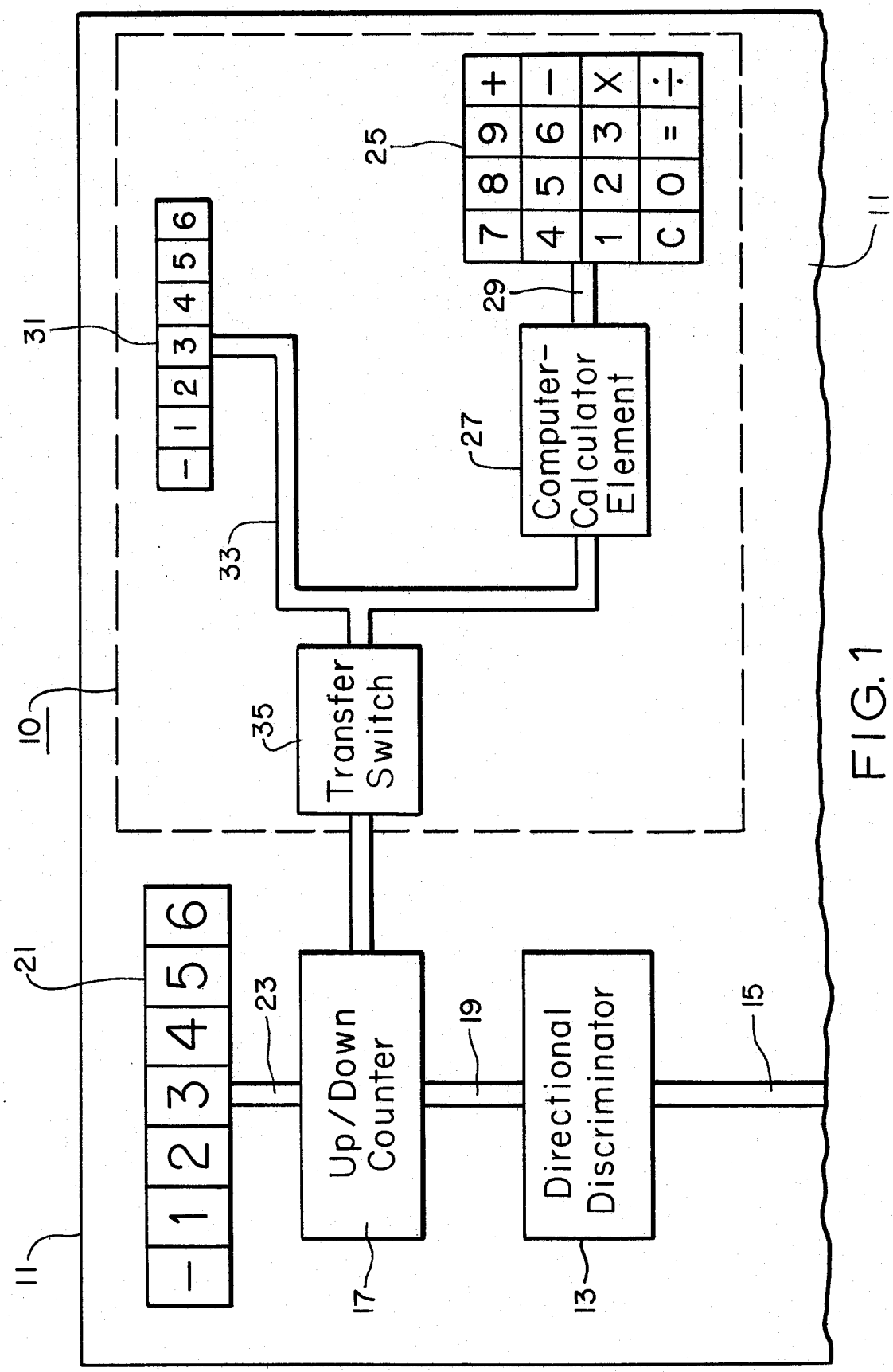
FIG. 1 is a block diagram of the counting system of the subject invention illustrating the keyboard type input system.

The disclosed counting system may be used, for example, in a digital incremental displacement measuring system or in any other system wherein a numerical display representative of a measured quantity is desired. Although the disclosed counting system has particular use in an incremental displacement measuring system, it would be apparent to one skilled in the art that the disclosed counting system can be readily adapted to any quantity measuring system wherein a digital output is desired.

All of the counting system components to be described below are mounted on a base plate 11 on which other elements which are not illustrated may be mounted for the particular application of the disclosed counting system.

A directional discriminator 13, which preferably includes sign storage capability, is mounted on the base plate 11 and has input pulses applied to it via an input conductor group 15 which is connected to a source of input pulse (not shown) which represent the count of the quantity to be measured. Count pulses from the output of the directional discriminator 13 are applied to an up-down counter 17 via a count conductor bundle 19. The up-down counter 17 is also mounted on the common base plate 11 and has its output applied to a system output numerical display 21 via an output conductor bundle 23. The output display 21 shows the present value of the count of the up-down counter 17.

The keyboard type input system 10 of the disclosed counting system includes a keyboard 25 which may be any of the readily available compact keyboards for use in pocket calculators or similar devices. It should be noted that although this schematic representation of the keyboard 25 indicates keys for the four basic arithmetical functions, keyboards with more or fewer functions may be used depending on the particular application of the electronic counting system. A computer-calculator element 27 is connected via a keyboard conductor bundle 29 to the keyboard 25 and receives numerical data and function commands from the keyboard 25 when the appropriate keys are manually depressed. An entry numerical display 31 is connected to the computer-calculator element 27 via an entry conductor bundle 33 for displaying numerical data which is either entered on the keyboard 25 or determined by a functional operation of the computer-calculator element 27. The numerical value displayed in the entry display 31 may be selectively applied to the up-down counter 17 upon appropriate actuation of the transfer switch 35. Application of the numerical value displayed in the entry display 31 to the up-down counter 17 sets the count within the up-down counter 17 to that particular value.

Readily available commercial products of various capabilities and sophistication may be used in the keyboard input system 10. This allows the keyboard input system to be adapted to the particular needs of the counting system users. Specifically, the computer-calculator element 27 can be obtained from various sources and are available with differing computing and storage capabilities. The keyboard 25 can also be one of several types available and should generally be compatible with the particular computer-calculator element 27 used in the input system 10. The entry display 31 can be chosen from a variety of products depending upon such factors as the number of significant digits required, reliability, power requirements, and applications use of the counting system.

From the foregoing, it is readily understood that in addition to its use with the disclosed counting system, the keyboard input system 10 can be used in conjunction with other types of digital counting systems wherein there is a need for the manual entry and/or calculation of initial values.

Although only a specific embodiment has been disclosed, it will be readily apparent to one skilled in the art that various changes and modifications can be made therein departing from the spirit and scope of the invention as defined by the following claims.

What is claimed is:

1. In combination with an incremental measuring system system having a directional discriminator for accepting input count pulses, an up-down counter, and a counter output display, the improvement comprising:
   keyboard means for the manual entry of numerical data;
   calculator logic means responsive to said keyboard entry means for accepting the numerical data;
   digital display means responsive to said calculator logic means for displaying the manually entered numerical data; and
   means for transferring the value displayed by the display means to the up-down counter to set the output value of the up-down counter to correspond to the displayed value.

2. The counting system of claim 1 wherein said calculator logic means comprises a multiple function calculator logic element.

3. An input system for manually setting the output value of an up-down counter of an incremental measuring system, comprising:
   keyboard means for the manual entry of numerical data and function commands;
   logic means responsive to said keyboard entry means for performing functions upon the numerical data in accordance with the function commands;
   means for displaying the manually entered numerical data and for displaying the numerical results from functions performed by said logic means; and
   means for transferring the value displayed by the display means to the up-down counter to set the output value of the up-down counter to correspond to the displayed value.

4. The counting system of claim 3 wherein said displaying means comprises a digital display.

5. The counting system of claim 3 wherein said logic means comprises a multiple function calculator logic element.

6. An electronic counting system for use in an incremental measuring system, comprising:
   a directional discriminator for accepting input pulses representative of a quantity to be measured;
   an up-down counter responsive to said directional discriminator for generating the count value;
   numerical display means responsive to said up-down counter for numerically displaying the count value generated by said up-down counter;
   means including a keyboard for the manual entry of numerical data to be used for setting said up-down counter; and
   means for selectively transferring numerical values from said entry means to the up-down counter to set the count value of said up-down counter to correspond to the transferred numerical value.

7. The counting system of claim 6 wherein said entry means comprises:
   computer logic means responsive to said keyboard and to the manually entered numerical data; and
   means for numerically displaying the manually entered numerical data and for displaying numerical values calculated by said computer logic means.

* * * * *

UNITED STATES PATENT AND TRADEMARK OFFICE
CERTIFICATE OF CORRECTION

PATENT NO. : 4,084,249
DATED : April 11, 1978
INVENTOR(S) : Helmut Schlick

It is certified that error appears in the above-identified patent and that said Letters Patent are hereby corrected as shown below:

IN THE CLAIMS:

Claim 1, line 2, delete the second appearance of "system".

Signed and Sealed this

Nineteenth Day of December 1978

[SEAL]

Attest:

RUTH C. MASON
Attesting Officer

DONALD W. BANNER
Commissioner of Patents and Trademarks